United States Patent
Badjatia et al.

(10) Patent No.: US 10,691,647 B2
(45) Date of Patent: *Jun. 23, 2020

(54) DISTRIBUTED FILE SYSTEM METERING AND HARDWARE RESOURCE USAGE

(71) Applicant: INTERNATIONAL BUSINESS MACHINES CORPORATION, Armonk, NY (US)

(72) Inventors: Sudeep Badjatia, Fremont, CA (US); Rajarshi Bhose, Bangalore (IN); Bijoy Deb, Kolkata (IN); Ripon Nandi, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/148,336

(22) Filed: Oct. 1, 2018

(65) Prior Publication Data
US 2019/0034241 A1   Jan. 31, 2019

Related U.S. Application Data

(63) Continuation of application No. 15/237,784, filed on Aug. 16, 2016, now Pat. No. 10,120,724.

(51) Int. Cl.
*G06F 9/50* (2006.01)
*G06F 9/48* (2006.01)
(Continued)

(52) U.S. Cl.
CPC ............ *G06F 16/183* (2019.01); *H04L 12/14* (2013.01); *H04M 15/31* (2013.01); *H04M 15/66* (2013.01);
(Continued)

(58) Field of Classification Search
None
See application file for complete search history.

(56) References Cited

U.S. PATENT DOCUMENTS 7,707,080 B2   4/2010   Agarwal
8,200,586 B2   6/2012   Alam
(Continued)

OTHER PUBLICATIONS

Friedman, Mark; List of IBM Patents or Patent Applications Treated as Related; Oct. 1, 2018; 1 page.

*Primary Examiner* — Abu Zar Ghaffari
(74) *Attorney, Agent, or Firm* — Schmeiser, Olsen & Watts; Mark C. Vallone

(57) ABSTRACT

A method and system for automatically metering a distributed file system node is provided. The method includes receiving data associated with jobs for execution via a distributed file system. Characteristics of the jobs are uploaded and policy metrics data associated with hardware usage metering is retrieved. Resource requests associated with hardware resource usage are retrieved and attributes associated with the resource requests are uploaded. The policy metrics data is analyzed and a recommendation circuit is queried with respect to the resource requests. A set of metrics of the policy metrics data associated with the resource requests is determined and a machine learning circuit is updated. Utilized hardware resources are determined with respect to the hardware usage metering and said resource requests.

20 Claims, 6 Drawing Sheets

(51) Int. Cl.
  *H04W 4/24*    (2018.01)
  *H04L 12/14*   (2006.01)
  *G06F 16/182*  (2019.01)
  *H04M 15/00*   (2006.01)
  *G06F 11/34*       (2006.01)
  *G06F 11/30*       (2006.01)

(52) U.S. Cl.
  CPC ........... *H04W 4/24* (2013.01); *G06F 11/3006* (2013.01); *G06F 11/3442* (2013.01); *G06F 11/3447* (2013.01)

(56) References Cited

U.S. PATENT DOCUMENTS

| | | | |
|---|---|---|---|
| 8,595,346 B2 | 11/2013 | Bairavasundaram | |
| 8,612,599 B2* | 12/2013 | Tung | G06F 11/3495 709/226 |
| 8,615,455 B2* | 12/2013 | Albaugh | G06Q 10/06316 705/35 |
| 8,719,415 B1 | 5/2014 | Sirota | |
| 8,799,491 B2* | 8/2014 | Agarwal | G06Q 20/102 709/229 |
| 9,152,469 B2 | 10/2015 | Cherkasova | |
| 9,202,239 B2* | 12/2015 | Van Biljon | G06Q 30/04 |
| 9,672,064 B2* | 6/2017 | Gupta | G06F 9/4806 |
| 9,848,041 B2 | 12/2017 | Einkauf | |
| 9,930,188 B2* | 3/2018 | Rolfe | H04M 15/765 |
| 10,198,295 B2* | 2/2019 | Moreno | G06F 9/5044 |
| 10,205,600 B2* | 2/2019 | Persson | G06F 11/3438 |
| 10,250,684 B2* | 4/2019 | Dimnaku | G06F 16/285 |
| 10,270,668 B1* | 4/2019 | Thompson | H04L 41/5009 |
| 2002/0152305 A1* | 10/2002 | Jackson | H04L 41/5035 709/224 |
| 2002/0194251 A1* | 12/2002 | Richter | G06F 9/5011 718/105 |
| 2003/0110044 A1 | 6/2003 | Nix | |
| 2003/0110423 A1* | 6/2003 | Helms | G06F 1/206 714/100 |
| 2003/0236745 A1* | 12/2003 | Hartsell | G06Q 20/102 705/40 |
| 2008/0319926 A1 | 12/2008 | Alam | |
| 2009/0043519 A1 | 2/2009 | Bridges | |
| 2010/0036698 A1 | 2/2010 | Garrison | |
| 2010/0223385 A1 | 9/2010 | Gulley | |
| 2012/0116937 A1 | 5/2012 | Van Biljon | |
| 2012/0290725 A1 | 11/2012 | Podila | |
| 2013/0166752 A1 | 6/2013 | Kim | |
| 2014/0101299 A1 | 4/2014 | Cherel | |
| 2014/0108639 A1 | 4/2014 | Nelke | |
| 2014/0229221 A1 | 8/2014 | Shih | |
| 2014/0229514 A1 | 8/2014 | Shazly | |
| 2014/0331234 A1* | 11/2014 | Gibson | G06F 1/3206 718/103 |
| 2015/0135185 A1* | 5/2015 | Sirota | G06F 9/5061 718/103 |
| 2016/0105029 A1 | 4/2016 | Sun | |
| 2016/0182324 A1* | 6/2016 | Harishankar | H04L 43/062 709/224 |
| 2017/0005813 A1* | 1/2017 | Sobh | G06F 9/452 |
| 2017/0060918 A1* | 3/2017 | Iyer | G06F 16/185 |
| 2018/0052714 A1 | 2/2018 | Badjatia | |

\* cited by examiner

DISTRIBUTED FILE SYSTEM METERING AND HARDWARE RESOURCE USAGE

CROSS REFERENCE TO RELATED APPLICATIONS

This application is a continuation application claiming priority to Ser. No. 15/237,784 filed Aug. 16, 2016, now U.S. Pat. No. 10,120,724, issued Nov. 6, 2018, the contents of which are hereby incorporated by reference.

FIELD

The present invention relates generally to a method for metering hardware resource usage and in particular to a method and associated system for improving hardware usage technology by determining utilized hardware resources with respect to hardware usage metering and hardware resource requests.

BACKGROUND

Processes for determining customer services based on allocated hardware resources are well known. A large number of solutions currently exist with respect to defining allocations through a set of tracking patterns. Types and associated resources may vary depending on a system at hand. Similarly, mapping a set of parameters to associated resources at any given point in time may directly provide information with respect a system status at the given point in time. However, determining resource usage may be used to determine more valid information with respect to hardware resource usage. Current solutions for determining resource usage may comprise executing an algorithm for reducing application usage.

Additionally (in a multi tenanted distributed file system environment), it is imperative to charge consumers based on resources utilized and not allocated and there is no current system in place that may accurately quantify costs associated with the utilization of the resources, provide a fine-grained metering, and create a detailed bill of charges.

However, the aforementioned solutions may be associated with a difficulty of determining resource utilization with respect to accurate metering processes. As a result, the current solutions do not comprise an effective means for performing a fine grained metering process associated with resource utilization.

Accordingly, there exists a need in the art to perform a metering process based on utilized resources associated with specified job submissions.

SUMMARY

A first aspect of the invention provides a distributed file system node fine grained metering method comprising: receiving from a user, by a processor of a hardware device, job data associated with jobs for execution via a distributed file system; uploading, by the processor to a memory device of the hardware device, characteristics of the jobs; retrieving, by a processor enabling a policy engine circuit of a hardware device, policy and cost metrics data associated with hardware usage metering, wherein the policy and cost metrics data comprises policies implemented as pluggable components defined in advance, by: uploading xml files, via descriptor files or json files, or via a command line, for the jobs; retrieving, by the processor enabling a hardware device cluster, resource requests associated with hardware resource usage; uploading, by the processor enabling a job descriptor engine of the hardware device, attributes associated with the resource requests; analyzing, by the processor enabling the job descriptor engine of the hardware device, the policy and cost metrics data; querying, by the processor enabling the job descriptor engine of the hardware device, a recommendation circuit with respect to the resource requests; determining, by the processor enabling a machine learning circuit with respect to results of the querying, a set of metrics of the policy and cost metrics data associated with the resource requests; updating, by the processor based on the set of metrics, the machine learning circuit; and determining, by the processor enabling a metrics circuit with respect to the set of metrics, utilized hardware resources with respect to the hardware usage metering and the resource requests.

A second aspect of the invention provides a computer program product, comprising a computer readable hardware storage device storing a computer readable program code, the computer readable program code comprising an algorithm that when executed by a processor of a hardware device implements a distributed file system node fine grained metering method, the method comprising: receiving from a user, by the processor, job data associated with jobs for execution via a distributed file system; uploading, by the processor to a memory device of the hardware device, characteristics of the jobs; retrieving, by a processor enabling a policy engine circuit of a hardware device, policy and cost metrics data associated with hardware usage metering, wherein the policy and cost metrics data comprises policies implemented as pluggable components defined in advance, by: uploading xml files, via descriptor files or json files, or via a command line, for the jobs; retrieving, by the processor enabling a hardware device cluster, resource requests associated with hardware resource usage; uploading, by the processor enabling a job descriptor engine of the hardware device, attributes associated with the resource requests; analyzing, by the processor enabling the job descriptor engine of the hardware device, the policy and cost metrics data; querying, by the processor enabling the job descriptor engine of the hardware device, a recommendation circuit with respect to the resource requests; determining, by the processor enabling a machine learning circuit with respect to results of the querying, a set of metrics of the policy and cost metrics data associated with the resource requests; updating, by the processor based on the set of metrics, the machine learning circuit; and determining, by the processor enabling a metrics circuit with respect to the set of metrics, utilized hardware resources with respect to the hardware usage metering and the resource requests.

A third aspect of the invention provides a hardware device comprising a processor coupled to a computer-readable memory unit, the memory unit comprising instructions that when executed by the processor executes a distributed file system node fine grained metering method comprising: receiving from a user, by the processor, job data associated with jobs for execution via a distributed file system; uploading, by the processor to a memory device of the hardware device, characteristics of the jobs; retrieving, by a processor enabling a policy engine circuit of a hardware device, policy and cost metrics data associated with hardware usage metering, wherein the policy and cost metrics data comprises policies implemented as pluggable components defined in advance, by: uploading xml files, via descriptor files or json files, or via a command line, for the jobs; retrieving, by the processor enabling a hardware device cluster, resource requests associated with hardware resource usage; uploading, by the processor enabling a job descriptor engine of the hardware device, attributes associated with the resource requests; analyzing, by the processor enabling the job descriptor engine of the hardware device, the policy and cost metrics data; querying, by the processor enabling the job descriptor engine of the hardware device, a recommendation circuit with respect to the resource requests; determining, by the processor enabling a machine learning circuit with respect to results of the querying, a set of metrics of the policy and cost metrics data associated with the resource requests; updating, by the processor based on the set of metrics, the machine learning circuit; and determining, by the processor enabling a metrics circuit with respect to the set of metrics, utilized hardware resources with respect to the hardware usage metering and the resource requests.

A fourth aspect of the invention provides a distributed file system resource utilization metering method comprising: analyzing, by a processor enabling an analysis circuit, resource requests associated with resource usage of hardware devices in a multi-tenancy system; monitoring, by the processor, the resource usage of the hardware devices with respect to functions executed by the hardware devices in response to the resource requests; determining, by the processor, that the functions executed by the hardware devices have been completed; determining, by the processor, billing amounts for the resource usage of the hardware devices; analyzing, by the processor, the billing amounts; and modifying components of the hardware devices based on the analyzing the billing amounts.

A fifth aspect of the invention provides a hardware device comprising a processor coupled to a computer-readable memory unit, the memory unit comprising instructions that when executed by the processor executes a distributed file system resource utilization metering method comprising: analyzing, by the processor enabling an analysis circuit, resource requests associated with resource usage of hardware devices in a multi-tenancy system; monitoring, by the processor, the resource usage of the hardware devices with respect to functions executed by the hardware devices in response to the resource requests; determining, by the processor, that the functions executed by the hardware devices have been completed; determining, by the processor, billing amounts for the resource usage of the hardware devices; analyzing, by the processor, the billing amounts; and modifying components of the hardware devices based on the analyzing the billing amounts.

The present invention advantageously provides a simple method and associated system capable of determining customer services based on allocated hardware resources.

DETAILED DESCRIPTION

Figure 1:
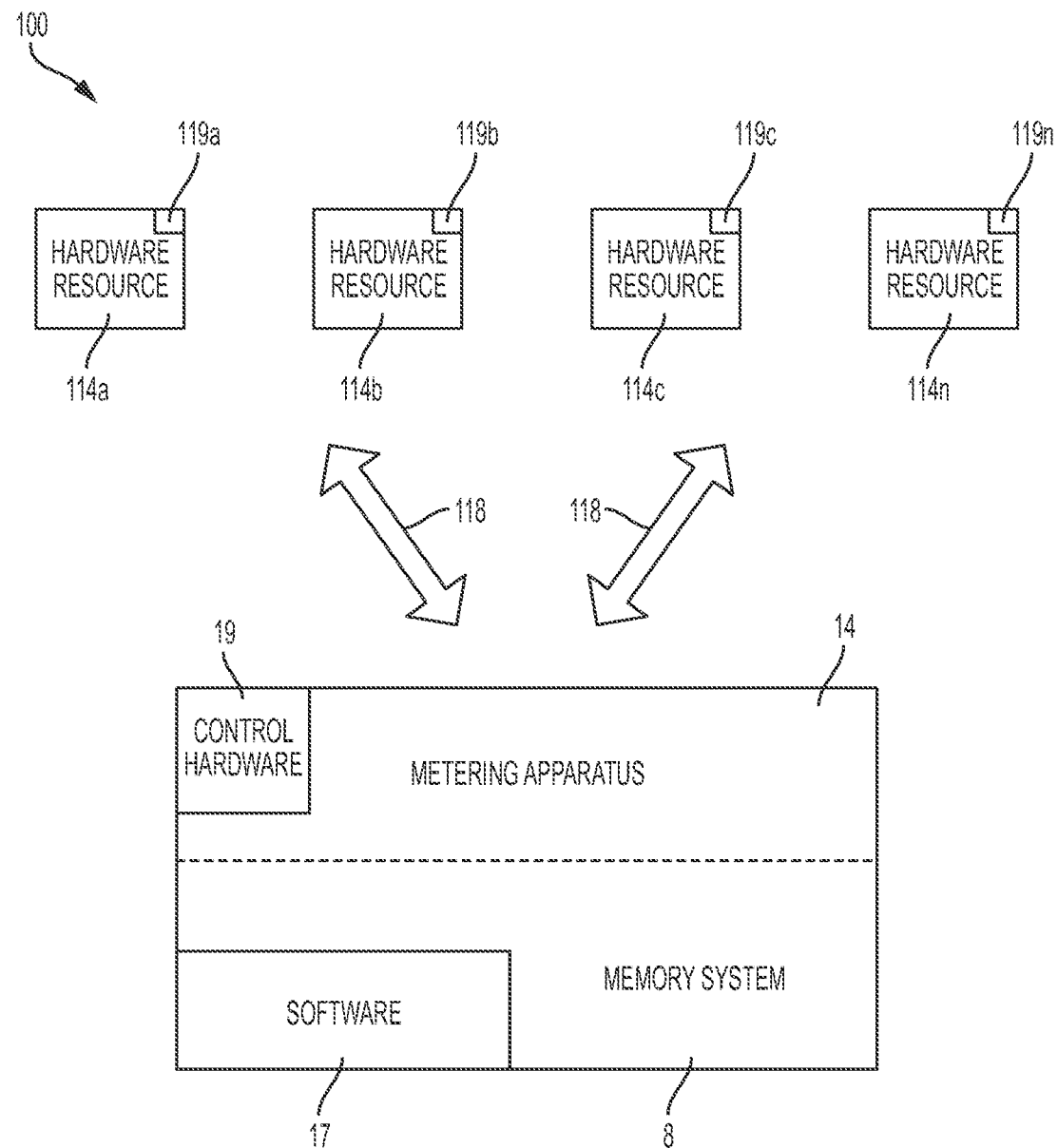
FIG. 1 illustrates a system for determining utilized hardware resources with respect to hardware usage metering and hardware resource requests, in accordance with embodiments of the present invention.

FIG. 1 illustrates a system 100 for determining utilized hardware resources with respect to hardware usage metering and hardware resource requests, in accordance with embodiments of the present invention. Typical distributed file systems (e.g., a general parallel file system) generally comprise multi tenanted systems with varying workload requirements. Multi-tenancy features (e.g., resource sharing, service level agreements, security) have matured in recent years. However, there is a critical need to define a costing method through which hardware resource consumption may be effectively measured and charged. Currently, distributed system are metered via an infrastructure as a service model associated with parameters such as, inter alia, system up time duration, a number and size of instances, storage space, etc. Therefore, system 100 enables fine grained metering capabilities with respect to distributed file system hardware based on actual hardware resources consumed by submitted jobs.

System 100 of FIG. 1 includes hardware resources 114a . . . 114n in communication with a metering apparatus 14 via a network 118. Hardware resources 114a . . . 114n and metering apparatus 14 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, hardware resources 114a . . . 114n and metering apparatus 14 may each comprise a specialized hardware device comprising specialized (non-generic) hardware and circuitry (i.e., specialized discrete non-generic analog, digital, and logic based circuitry) for executing a process described with respect to FIGS. 1-5. The specialized discrete non-generic analog, digital, and logic based circuitry may include proprietary specially designed components (e.g., a specialized integrated circuit such as a job descriptor engine, or a machine learning circuit (as described, infra) designed for only implementing an automated process for determining utilized hardware resources with respect to hardware usage metering and hardware resource requests). Hardware resources 114a . . . 114n comprise (associated) sensors 119a . . . 119n for sensing and determining hardware resource usage (e.g., CPU/speed/usage, memory space available, etc.). Sensors may include, inter alia, optical sensors, weight sensors, pressure sensors, voltage sensors, temperature sensors, flow sensors, pressure sensors, etc. Metering apparatus 14 includes a memory system 8, software 17, and control hardware 19 (all sensors, interfaces, and associated control hardware for enabling software 17 to communicate with hardware resources 114a . . . 114n and execute a process for determining utilized hardware resources with respect to hardware usage metering and hardware resource requests). Control hardware 19 may include sensors. Sensors may include, inter alia, optical sensors, weight sensors, pressure sensors, voltage sensors, temperature sensors, flow sensors, pressure sensors, etc. The memory system 8 (e.g., a database) may include a single memory system. Alternatively, the memory system 8 may include a plurality of memory systems. Hardware resources 114a . . . 114n may comprise any type of hardware devices (comprising embedded circuitry for only performing an automated process for determining utilized hardware resources with respect to hardware usage metering and hardware resource requests).

System 100 of FIG. 1 enables a process for metering consumers based on actual hardware resources utilized and consumed by a user for completing a task with respect to big data distributed file systems by:
1. Analyzing resource jobs allocated to users in a multi-tenancy environment.
2. Monitoring an amount/percent of resources utilized (e.g., CPU time, memory, network resources for data transfer, etc.) by users for completion of the jobs.
3. Providing a fine grained billing with respect to big data distributed file systems.

Therefore, system 100 provides resource based metering over a multi tenanted distributed file system and comprises a crosscutting and non-invasive plugin (circuitry) that integrates with distributed file systems thereby providing an improvement to determining customer services based on hardware resource usage.

Figure 2:
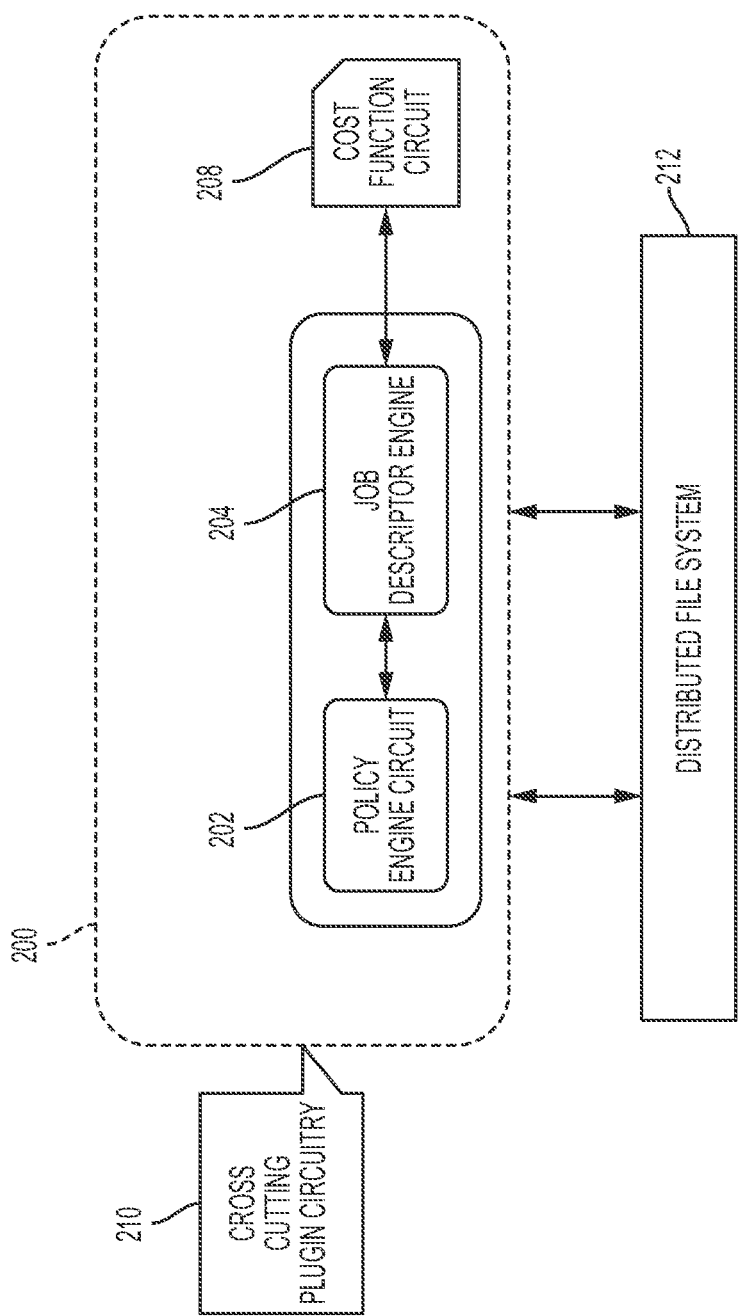
FIG. 2 illustrates a detailed view of the metering apparatus of FIG. 1, in accordance with embodiments of the present invention.

FIG. 2 illustrates a detailed view 200 of metering apparatus 14 of FIG. 1, in accordance with embodiments of the present invention. Metering apparatus 14 comprises the following components: a policy engine circuit 202, a job descriptor engine 204, a cost function circuit 208, and a cross cutting plugin circuit 210 connected to a distributed file system 212. Distributed file system may comprise, inter alia, Hadoop distributed File System (HDFS). Policy engine circuit 202 generates various policies and cost metrics for calculating resource usage metering. A policy is defined herein as a pluggable component defined in advance or on demand. A policy may be dynamically updated via a feedback mechanism associated with a specific job or set of jobs. A job is defined herein as a resource request submitted by a user of distributed file system 212. A job may be characterized based on a type of activity performed. For example, an activity may comprise, inter alia, I/O functions requiring multiple read/write functions, CPU functions requiring multiple processor computations, etc. Job descriptor engine 204 may comprise a specialized electrical circuit and/or software for providing circuitry for defining characteristics of a job. Job descriptor engine 204 is configured to accept inputs with respect to characteristics of a job described via a descriptive syntax. A descriptive syntax may be manually provided by a user at a time of job submission. A descriptive syntax may describe data volume, a minimum and maximum memory required, a data transfer rate limit, speculative execution to be followed, a type of scheduler to be used, a priority, etc. Associated values may be submitted via: command line mode, a descriptive properties file, a JSON syntax etc. The associated values are used as inputs to constants used by a cost function executed by cost function circuit 208.

Job descriptor engine 204 is configured to execute a machine learning algorithm (of a machine learning circuit within job descriptor engine 204) that dynamically updates itself based on a history of job types that have been executed in a sequence. For example, a hidden markov model (HMM) may be utilized as a machine-learning algorithm. Job descriptor engine 204 may dynamically update characteristics of jobs based on multiple scenarios such as, inter alia, network delays, sudden change of data volumes, hardware failure, etc. Additionally, job descriptor engine 204 may execute machine learning algorithms to estimate job characteristics and adapt to changing workload requirements. Multiple classification algorithms (e.g., a nearest neighbor algorithm) may be used to segment jobs for allocating resources and estimating capacity requirements. A neural network algorithm may be used to generate mathematical models based on relationships between various input elements of a cost function, historical information of jobs submitted, and correlation analysis between segments of job types and user groups. Markov model monte carlo algorithms may be used to estimate and allocate resources for a job based on its current state.

Job descriptor engine 204 generates an output comprising values for constants associated with a cost function as described, infra. The values for the constants are dynamic and may change based on different types of jobs but will remain constant for a same type or category of the job if all other parameters of a distributed environment (distributed file system 212) remain constant. Therefore, if there are any changes with respect to environment factors, a value for the constants will likely change thereby impacting a resource usage cost.

Job descriptor engine 204 generates recommendations for a configuration of a hardware cluster based on an analysis with respect to a type of workload and job characterization. In a typical hardware cluster for a distributed system, hardware comprising ram, hard drives, computer nodes, cores, etc. are fixed at a time of provisioning of the hardware cluster. Job descriptor engine 204 provides (based on job analysis or learning algorithms from previous executions) a dynamic recommendation with respect to the improvement of configurations improvements for associated costs for execution on differing configuration. Additionally, job descriptor engine 204 optimizes job cost and associated infrastructure for dynamically recommending allocation of a separate queue or fixed size allocation of resources to job. For example, a yarn queue may be generated with fixed allocation for memory and cores based on learning algorithms for creating and recommending jobs to queues thereby enabling more control for overall resource utilization of a hardware cluster and improvement with respect to a scope of more jobs being executed on a hardware cluster. The aforementioned process impacts a cost associated with a particular type of job and would be repeatable for jobs determined to comprise same characteristics.

Cost function circuit determines a cost defined as an aggregate function involving the following parameters:
a. Total memory resources utilized for a particular job in terms of units of memory defined by a system or user.
b. Total computer resources utilized by a particular job in terms of CPU time utilization based on a percentage or fraction of total CPU utilization by the particular job.
c. Total network resources utilized by a particular job for data transfer between intra and inter nodes in terms of multiples of bytes.
d. Whether preemptive processes were utilized and required.
e. A total number of slots occupied and used.
f. A confidence factor stating acceptance criteria for job completion. The confidence factor may be defined by a user. For example, a user may define (as input to policy engine circuit 202) a 95% confidence factor implying that a job will be considered successful if it is 95% complete.

g. A cost function addressing a need for inherent and indirect costs (such as storage costs) by associating background jobs running to ensure consistency and availability of distributed storage. For example, file system checks may comprise background jobs that are charged based on a cost function defined.

A cost function is defined as: Cost=(Confidence Factor)$*\Sigma_0{}^n((a\,\Sigma_{0\%}{}^{100\%}$ Memory)$+$(b $\Sigma_{0\%}{}^{100\%}$ CPU Utilization)$+$(c $\Sigma_{n=1}{}^{n=\infty}$ Network Data Transfer)$+$(d $\int_{t=0}{}^{t=n}$ Scheduler Time)$+$(e $\Sigma_0{}^n$ Preemption)$+$($\Sigma_0{}^n$ Slots Used)). Parameters a, b, c, d, and e (as defined, supra) comprise constant factors that may change based on characteristics determined by job descriptor engine 204. Costs may be translated into monetary terms based on a value of the cost function for a particular job executed by a user. The cost is related to the use of infrastructure resources at a fine grained level of the actual utilization of various distributed file system resources.

Distributed file system 212 (framework) provides counters that may be leveraged to calculate relevant resource consumption details of a particular job of interest. Counters comprise lightweight objects that allow system progress tracking and reduce stages of processing. Distributed file system 212 defines a number of standard counters in groups presented via a job tracker web application presenting, inter alia, memory consumed by a job, CPU utilization, data read/written, etc.

Counters associated with the cost function may include:
1. CPU_MILLISECONDS comprising a total time spent by all tasks of a particular job with respect to a CPU
2. PHYSICAL_MEMORY_BYTES comprising total physical memory consumed by all tasks of a particular job.
3. VIRTUAL_MEMORY_BYTES comprising a total virtual memory (RAM+Swap) consumed by all tasks of a particular job.
4. REDUCE_SHUFFLE_BYTES comprising a total number of bytes of output from map tasks copied to a reducer during a shuffle phase.
5. FILE_BYTES_READ comprising a total number of bytes of data read from a local file system.
6. FILE_BYTES_WRITTEN comprising a total number of bytes of data written to a local file system.
7. HDFS_BYTES_READ comprising a total number of bytes of data read from distributed file system 212.
8. HDFS_BYTES_WRITTEN comprising a total number of bytes of data written to distributed file system 212.
9. TOTAL_LAUNCHED_MAPS comprising a total of map tasks launched for a job.
10. TOTAL_LAUNCHED_REDUCES comprising a total of reduced tasks launched for a job.

Therefore, metering apparatus 14 of FIG. 1 addresses a critical need for charging consumers based on resource utilization instead of resource allocation. Consumers in a multi-tenant distributed file system may be charged based on fine-grained metering and utilization of a hardware cluster in a service mode.

Therefore metering apparatus 14 provides the following improved software (and associated hardware) functionality:
1. A self-improving metering/cost function such that a cost calculation automatically re-calibrates itself based on similar/historical jobs of similar characteristics with respect to distributed file systems and hardware resource utilization in combination with inputs from the job descriptor engine 204 with respect to a recommendation engine and associated learning algorithm.
2. Analysis of job characteristics via job descriptor engine 204 and associated recommendations provided with respect to resource requirements for future jobs via machine learning techniques for optimizing resource utilization and associated cost/metering.
3. A cost function able to calculate resource usage at a micro level for each job to be used for recommending how resource utilization at an application level takes place within distributed systems such as, inter alia, a Hadoop distributed file system. Resource utilization may include, inter alia, usage of a number of file handles, memory optimizations allocation for jobs, etc.
4. Analyzing an idle time with respect to a time that jobs spend in job queues before a system scheduler assigns the job for execution thereby providing accurate metering of hardware resource utilization. Therefore, metering apparatus 14 is able to compute time and resources associated with underutilization resulting in recommendations with respect to how effectively jobs may be scheduled thereby providing enhanced capability for software platform improvements.

Figure 3:
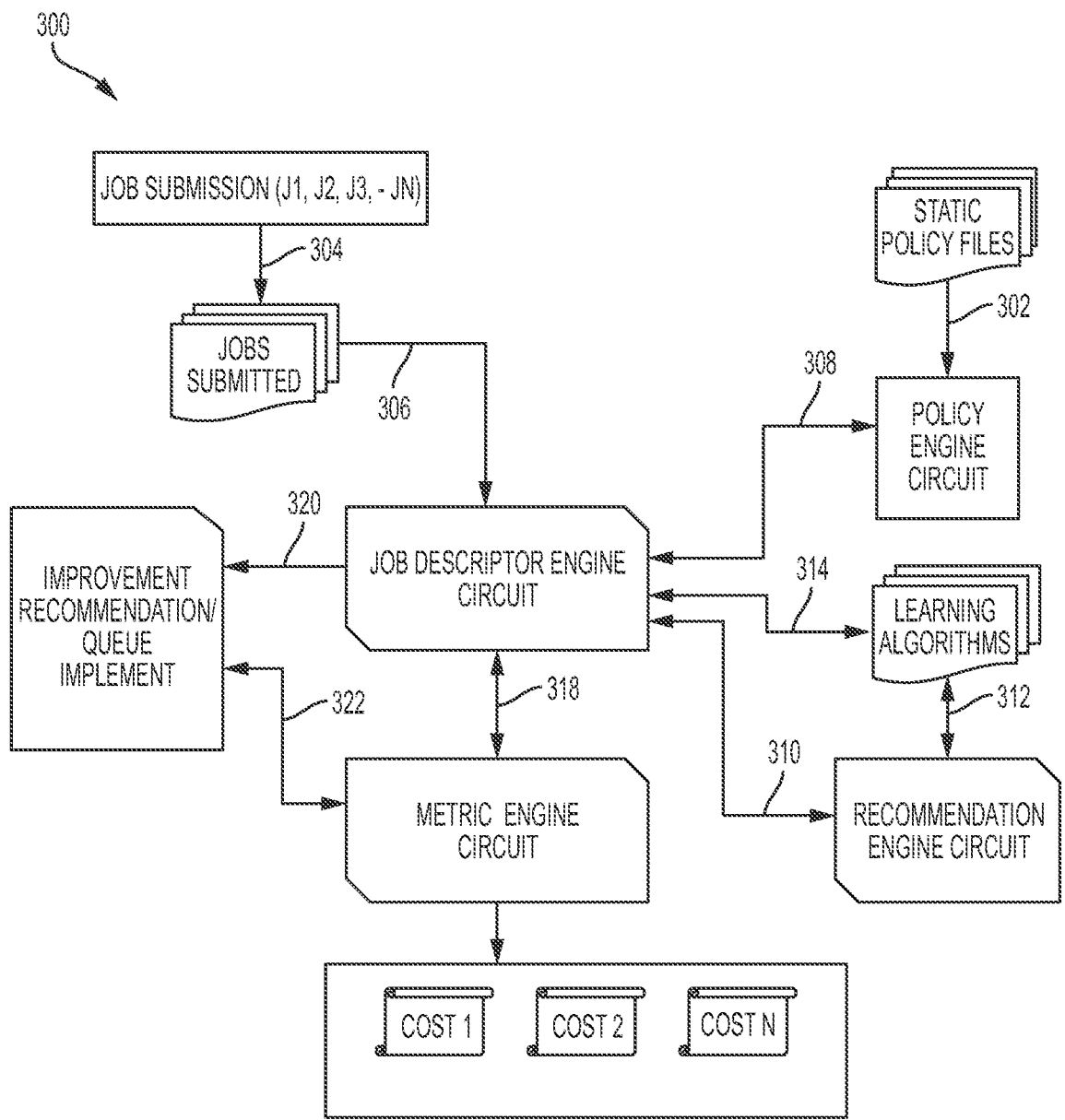
FIG. 3 illustrates a system diagram detailing a process flow enabled by the system of FIG. 1 for determining utilized hardware resources with respect to hardware usage metering and hardware resource requests, in accordance with embodiments of the present invention.

FIG. 3 illustrates a system diagram 300 detailing a process flow enabled by system 100 of FIG. 1 for determining utilized hardware resources with respect to hardware usage metering and hardware resource requests, in accordance with embodiments of the present invention. In step 302, a policy engine circuit provides various policies and cost metrics for calculating metering. The policies may comprise pluggable components and may be defined in advance for a particular job or set of jobs by uploading xml files or via a command line. The policies may be static and defined in advanced. In step 304, jobs are submitted (manually or automatically) into a distributed/multi-tenanted hardware cluster. In step 306, job characteristics are uploaded to a job descriptor engine via a descriptive syntax. In step 308, the job descriptor engine communicates with the policy engine circuit to retrieve policy details. In step 310, a job descriptor engine queries a recommendation engine circuit for additional recommendations. In step 312, the recommendation engine circuit executes a learning mechanism to determine best metrics. In step 314, the recommendation engine circuit updates learning mechanism results. In step 318, the job descriptor engine provides metrics to the metric engine circuit. In response, the metric engine circuit captures details associated with utilized resources via a system API for each job. In step 320, the job descriptor engine provides recommendations for infrastructure improvements such as, inter alia, additional hardware or resource optimization for improving the overall utilization of a hardware cluster. In step 322, recommendations from step 320 are provided to the metric engine circuit for providing granular control to the cost function.

Figure 4:
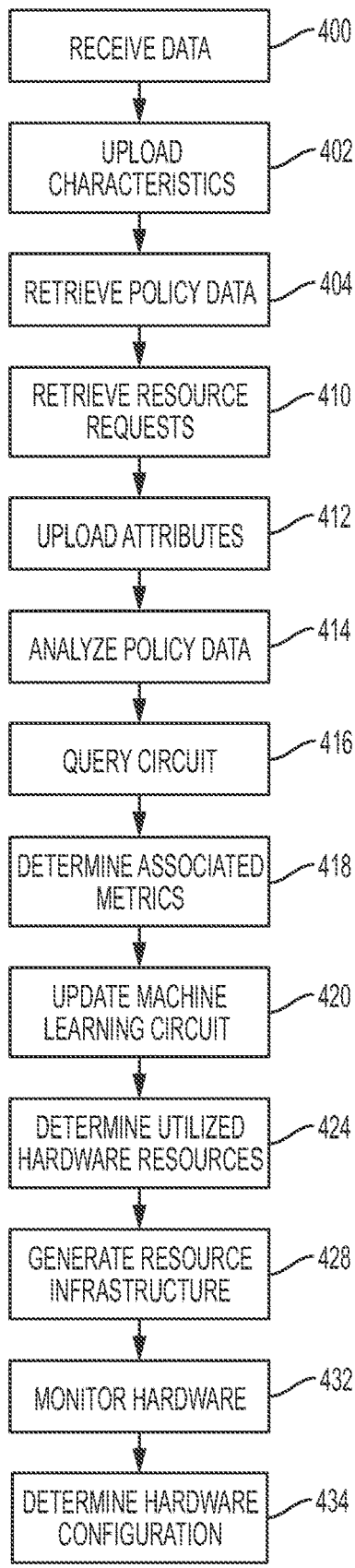
FIG. 4 illustrates an algorithm detailing a process flow enabled by the system of FIG. 1 for determining utilized hardware resource nodes with respect to fine grained hardware usage metering and hardware resource requests, in accordance with embodiments of the present invention.

FIG. 4 illustrates an algorithm detailing a process flow enabled by system 100 of FIG. 1 for determining utilized hardware resource nodes with respect to fine grained hardware usage metering and hardware resource requests, in accordance with embodiments of the present invention. Each of the steps in the algorithm of FIG. 4 may be enabled and executed in any order by a computer processor(s) or any type of specialized hardware executing computer code. In step 400, job data associated with jobs for execution via a distributed file system (e.g., a multi tenanted distributed file system) are received (by a hardware device) from a user. In step 402, characteristics of the jobs are uploaded to a memory device of the hardware device. In step 404, policy and cost metrics data associated with hardware usage metering is retrieved by a processor enabling a policy engine circuit of the hardware device. The policy and cost metrics data comprises policies implemented as pluggable components defined in advance by: uploading xml files, via descriptor files or json files, or via a command line for the jobs. In step 410, resource requests associated with hardware resource usage are retrieved by the processor enabling a hardware device cluster. In step 412, attributes associated with the resource requests are uploaded by a job descriptor engine (comprising circuitry for defining characteristics of the jobs for execution on: a plurality of nodes, hardware resources, processors, memory devices, and distributed system networks) of the hardware device. In step 414, the policy and cost metrics data are analyzed by a job descriptor engine. In step 416, a recommendation circuit is queried with respect to the resource requests. In step 418, a set of metrics (of the policy and cost metrics data associated with the resource requests) is determined (by a machine learning circuit) with respect to results of the query of step 416. In step 420, the machine learning circuit is updated based on the set of metrics determined in step 418. In step 424, utilized hardware resources with respect to the hardware usage metering and resource requests are determined with respect to the set of metrics. In step 428, a resource infrastructure associated with hardware resources of the resource requests is generated via a resource descriptor circuit. The resource infrastructure is generated based on the policy engine circuit providing various policies and cost metrics for calculating the hardware usage metering. The resource infrastructure enables:

1. Resource infrastructure improvements that include replacing hardware components of the hardware resources.
2. Resource infrastructure improvements that include adding new hardware resources to the resource infrastructure comprising the hardware resources.
3. Resource infrastructure improvements that include optimizing functionality of the hardware resources. The improvements include dynamically recommending allocation of separate queue or fixed size allocation of the hardware resources to the jobs such that an overall resource utilization of a cluster enables additional jobs being executed on the cluster. In step 432, a plurality of nodes, hardware resources, processors, memory devices, and distributed system networks are monitored. In step 434, a configuration of the hardware device cluster is determined based on an analysis of types of workloads and job characterizations. Workloads may be associated with the plurality of nodes, the hardware resources, the processors, the memory devices, and the distributed system networks. Additionally, optimized recommendations associated with a group of jobs or improving a configuration of the hardware device cluster may be determined.

Figure 5:
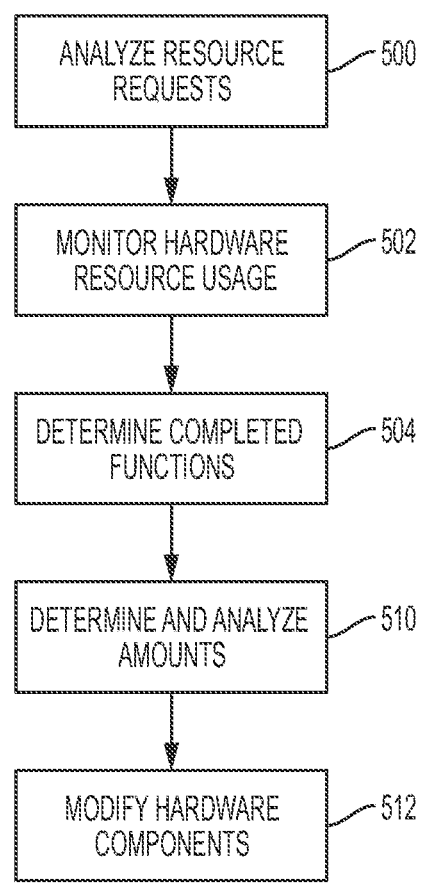
FIG. 5 illustrates an algorithm detailing an alternative process flow, with respect to the process flow of FIG. 3, enabled by the system of FIG. 1 for determining utilized hardware resources with respect to hardware usage metering and hardware resource requests, in accordance with embodiments of the present invention.

FIG. 5 illustrates an algorithm detailing an alternative process flow, with respect to the process flow of FIG. 3, enabled by system 100 of FIG. 1 for determining utilized hardware resources with respect to hardware usage metering and hardware resource requests, in accordance with embodiments of the present invention. Each of the steps in the algorithm of FIG. 5 may be enabled and executed in any order by a computer processor(s) or any type of specialized hardware executing computer code. In step 500, resource requests associated with resource usage of hardware devices in a multi-tenancy system are analyzed. In step 502, the resource usage of the hardware devices is analyzed (in response to the resource requests) with respect to functions executed by the hardware devices. In step 504, it is determined that the functions executed by the hardware devices have been completed. In step 510, billing amounts for the resource usage are determined and analyzed. In step 512, components of the hardware devices are modified based on analyzing the billing amounts.

Figure 6:
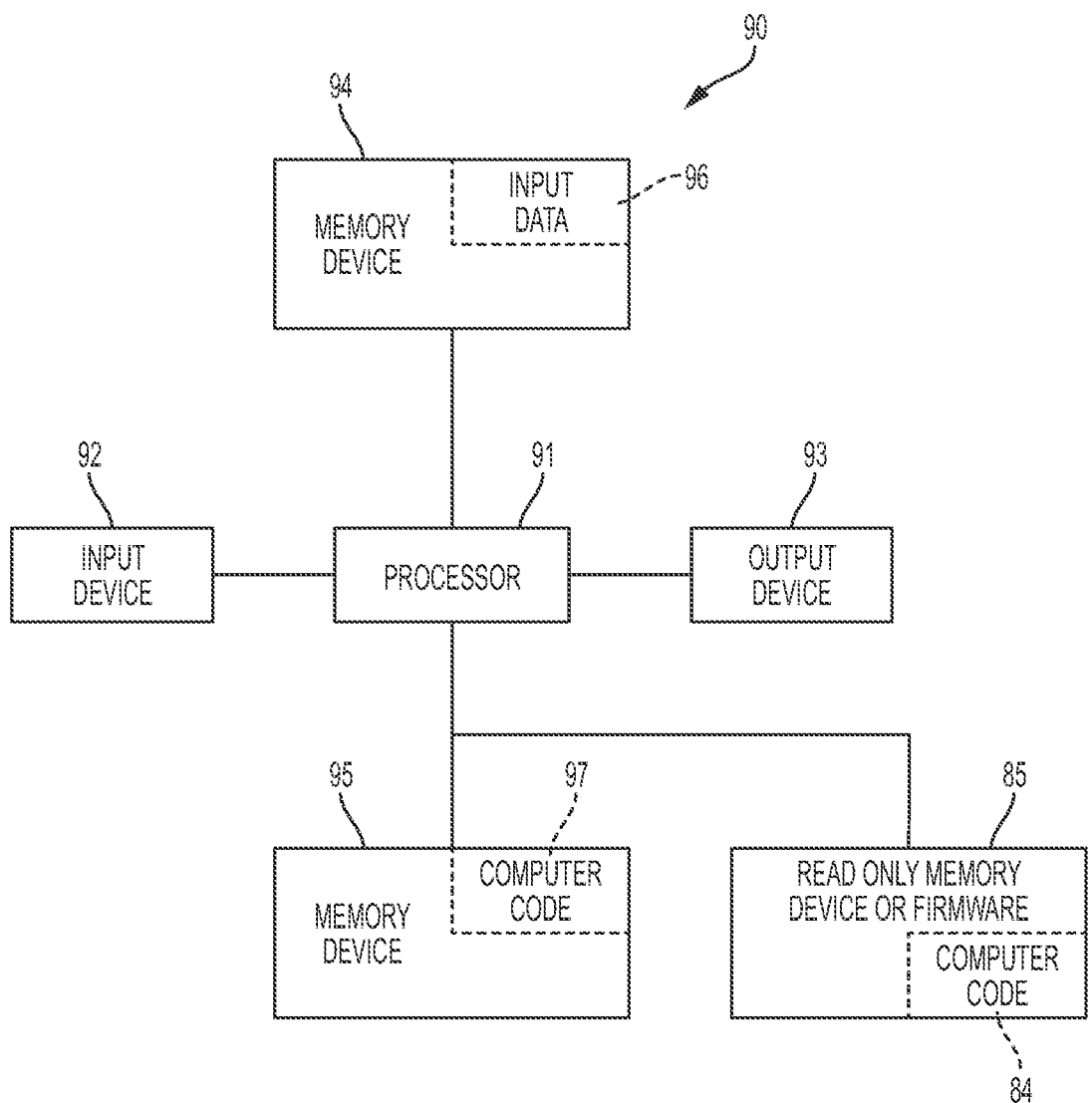
FIG. 6 illustrates a computer system used by the system of FIG. 1 for enabling a process for determining utilized hardware resources with respect to hardware usage metering and hardware resource requests, in accordance with embodiments of the present invention.

FIG. 6 illustrates a computer system 90 (e.g., hardware resources 114*a* . . . 114*n* and metering apparatus 14) used by or comprised by the system of FIG. 1 for determining utilized hardware resources with respect to hardware usage metering and hardware resource requests, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-5) for enabling a process for determining utilized hardware resources with respect to hardware usage metering and hardware resource requests. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithm of FIGS. 2-5) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithm) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for determining utilized hardware resources with respect to hardware usage metering and hardware resource requests. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for determining utilized hardware resources with respect to hardware usage metering and hardware resource requests. In another embodiment, the invention provides a business method that performs the process steps of the invention on a subscription, advertising, and/or fee basis. That is, a service supplier, such as a Solution Integrator, could offer to enable a process for determining utilized hardware resources with respect to hardware usage metering and hardware resource requests. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A distributed file system metering and hardware usage technology improvement method comprising:

receiving from a user, by a processor of a hardware device comprising specialized discrete non-generic analog, digital, and logic based plugin circuitry including a specially designed integrated circuit designed for only implementing said distributed file system metering and hardware usage technology improvement method, job data associated with jobs for execution via a distributed file system;

retrieving, by said processor enabling a policy engine circuit of said hardware device, policy and cost metrics data associated with hardware usage metering, wherein said policy and cost metrics data comprises policies implemented as pluggable components defined in advance, by: uploading xml files, via descriptor files or j son files, or via a command line, for said jobs;

retrieving, by said processor enabling a hardware device cluster, resource requests describing hardware resource usage of said jobs with respect to a level of the actual utilization of hardware resources;

querying, by said processor enabling a job descriptor engine of said hardware device, a first circuit for locating said policy and cost metrics data of said resource requests;

updating, by said processor based on a set of metrics of said policy and cost metrics data associated with said resource requests, a machine learning circuit with characteristics of said jobs associated with network delays, sudden change of memory data volumes, and hardware device failure;

detecting, by said processor enabling voltage sensors comprised by said hardware device, voltages associated with a hardware cluster;

detecting, by said processor enabling temperature sensors comprised by said hardware device, temperature readings associated with said hardware cluster, wherein said voltages and said temperature readings are analyzed to indicate a speed and usage of CPUs and a memory space available for said hardware cluster;

determining, by said processor enabling a metrics circuit with respect to said set of metrics, said voltages, and said temperature readings, utilized hardware resources of said hardware cluster with respect to said hardware usage metering of said resource requests; and allocating, by said processor based on results of said characteristics of said jobs and results of said determining said utilized hardware resources, specified queue memory and associated processor cores to said hardware cluster thereby enabling control functionality for overall resource utilization of said hardware cluster and improving execution of said jobs being executed on said hardware cluster;

generating, by said processor executing a resource descriptor circuit, resource infrastructure associated with hardware resources of said resource requests, wherein said generating is executed based on said policy engine circuit providing various policies and cost metrics for calculating said hardware usage metering, and wherein said policy engine circuit comprises the pluggable components;

monitoring, by said processor executing said job descriptor engine, a plurality of nodes, hardware resources, processors, memory devices, and distributed system networks; and determining, by said processor, a configuration of said hardware device cluster based on an analysis of types of workloads and said characteristics of said jobs;

determining, by said processor, workloads associated with said plurality of nodes, said hardware resources, said processors, said memory devices, and said distributed system networks;

determining, by said processor, a recommendation for improving said configuration of said hardware device cluster; and calculating, by said computer processor, a cost for improving said configuration of said hardware device cluster, wherein said Cost=(Confidence Factor)*$\Sigma_0^n((a \Sigma_{0\%}^{100\%}$ Memory)+(b $\Sigma_{0\%}^{100\%}$ CPU Utilization)+(c $\Sigma_{n=1}^{n=\infty}$ Network Data Transfer)+(d $\int_{t=0}^{t=n1}$ Scheduler Time)+(e $\Sigma_0^{n2}$ Preemption)+(f$\Sigma_0^{n3}$ Slots Used)), wherein n is a number of said plurality of nodes, n1 is an execution time of said jobs, n2 is a number of times said jobs were preempted, and n3 is a number of slots allocated to said job, wherein a, b, c, d, and e are weightage factors, wherein (a) comprises a weightage factor associated with memory, wherein said weightage factor associated with said memory comprises a variable per unit cost associated with said memory, wherein (b) comprises a weightage factor for a CPU, wherein said weightage factor for said CPU comprises a variable per unit cost associated with said CPU, wherein (c) comprises a weightage factor for network data transfer, wherein said weightage factor for said network data transfer comprises a variable per unit cost associated with said network data transfer, wherein (d) comprises a weightage factor associated with scheduling processes utilized for scheduling said jobs, wherein (e) comprises a weightage factor for a total number of preemptions, wherein said weightage factor for said total number of preemptions comprises a variable per unit cost associated with said total number of preemptions, wherein (f) comprises a total number of slots occupied and used, and wherein said (a), (b), (c), (d), (e), and (f) remain constant for a same type or category of said jobs if all additional parameters of a distributed environment remain constant.

2. The method of claim 1, wherein said distributed file system comprises a multi tenanted distributed file system.

3. The method of claim 2, wherein said job descriptor engine comprises circuitry for defining said characteristics of said jobs for execution on: said plurality of nodes, said hardware resources, said processors, said memory devices, and said distributed system networks.

4. The method of claim 3, wherein said job descriptor engine receives inputs associated with said characteristics of said jobs during submission of said jobs submission via a descriptive syntax, wherein said characteristics of said jobs comprise a minimum and maximum memory required or a limit associated with a data transfer rate.

5. The method of claim 4, wherein said job descriptor engine executes said machine learning circuit for dynamically updating itself with a history of job types, of said jobs, that have been executed in a specified sequence or have been submitted based on similar groups of users.

6. The method of claim 4, wherein said job descriptor engine dynamically updates said characteristics of the jobs based on network delays, sudden change of data volumes, or hardware failure, and wherein said job descriptor engine monitors said plurality of nodes, said hardware resources, said processors, a cluster health, and cluster optimum processing capability.

7. The method of claim 5, further comprising:
segmenting, by said processor, data describing said jobs for allocation of resources and estimation of capacity requirements.

8. The method of claim 7, further comprising:
generating, by said processor, dynamic values for constants associated with the cost function.

9. The method of claim 1, wherein said resource infrastructure enables resource infrastructure improvements comprising replacing hardware components of said hardware resources.

10. The method of claim 1, wherein said resource infrastructure enables resource infrastructure improvements comprising adding new hardware resources to said resource infrastructure comprising said hardware resources.

11. The method of claim 1, wherein said resource infrastructure enables resource infrastructure improvements comprising optimizing functionality resource utilization of said hardware resources with respect to each of said hardware resources, and wherein said resource infrastructure improvements comprise dynamically recommending allocation of separate queue or fixed size allocation of said hardware resources to said jobs such that an overall resource utilization of a cluster enables additional jobs being executed on said cluster.

12. The method of claim 1, further comprising:
providing at least one support service for at least one of creating, integrating, hosting, maintaining, and deploying computer-readable code in the hardware device, said code being executed by the computer processor to implement: said receiving, said retrieving said policy and cost metrics data, said retrieving said resource requests, said uploading said attributes, said analyzing, said determining said set of metrics, said updating, and said determining said utilized hardware resources.

13. A computer program product, comprising a computer readable hardware storage device storing a computer readable program code, said computer readable program code comprising an algorithm that when executed by a processor of a hardware device implements a distributed file system node metering and hardware usage technology improvement method, said method comprising:

receiving from a user, by said processor, job data associated with jobs for execution via a distributed file system, wherein said hardware device comprises specialized discrete non-generic analog, digital, and logic based plugin circuitry including a specially designed integrated circuit designed for only implementing said distributed file system metering and hardware usage technology improvement method;

retrieving, by said processor enabling a policy engine circuit of said hardware device, policy and cost metrics data associated with hardware usage metering, wherein said policy and cost metrics data comprises policies implemented as pluggable components defined in advance, by: uploading xml files, via descriptor files or json files, or via a command line, for said jobs;

retrieving, by said processor enabling a hardware device cluster, resource requests describing hardware resource usage of said jobs with respect to a level of the actual utilization of hardware resources;

querying, by said processor enabling a job descriptor engine of said hardware device, a first circuit for locating said policy and cost metrics data of said resource requests;

updating, by said processor based on a set of metrics of said policy and cost metrics data associated with said resource requests, a machine learning circuit with characteristics of said jobs associated with network delays, sudden change of memory data volumes, and hardware device failure;

detecting, by said processor enabling voltage sensors comprised by said hardware device, voltages associated with a hardware cluster;

detecting, by said processor enabling temperature sensors comprised by said hardware device, temperature readings associated with said hardware cluster, wherein said voltages and said temperature readings are analyzed to indicate a speed and usage of CPUs and a memory space available for said hardware cluster;

determining, by said processor enabling a metrics circuit with respect to said set of metrics, said voltages, and said temperature readings, utilized hardware resources of said hardware cluster with respect to said hardware usage metering of said resource requests; and allocating, by said processor based on results of said characteristics of said jobs and results of said determining said utilized hardware resources, specified queue memory and associated processor cores to said hardware cluster thereby enabling control functionality for overall resource utilization of said hardware cluster and improving execution of said jobs being executed on said hardware cluster;

generating, by said processor executing a resource descriptor circuit, resource infrastructure associated with hardware resources of said resource requests, wherein said generating is executed based on said policy engine circuit providing various policies and cost metrics for calculating said hardware usage metering, and wherein said policy engine circuit comprises the pluggable components;

monitoring, by said processor executing said job descriptor engine, a plurality of nodes, hardware resources, processors, memory devices, and distributed system networks; and determining, by said processor, a configuration of said hardware device cluster based on an analysis of types of workloads and said characteristics of said jobs;

determining, by said processor, workloads associated with said plurality of nodes, said hardware resources, said processors, said memory devices, and said distributed system networks;

determining, by said processor, a recommendation for improving said configuration of said hardware device cluster; and calculating, by said computer processor, a cost for improving said configuration of said hardware device cluster, wherein said Cost=(Confidence Factor)*$\Sigma_0^n$((a $\Sigma_{0\%}^{100\%}$ Memory)+(b $\Sigma_{0\%}^{100\%}$ CPU Utilization)+(c $\Sigma_{n=1}^{n=\infty}$ Network Data Transfer)+(d $\int_{t=0}^{t=n}$ Scheduler Time)+(e $\Sigma_0^n$ Preemption)+($\Sigma_0^n$ Slots Used)), wherein n is a number of said plurality of nodes, n1 is an execution time of said jobs, n2 is a number of times said jobs were preempted, and n3 is a number of slots allocated to said job, wherein a, b, c, d, and e are weightage factors, wherein (a) comprises a weightage factor associated with memory, wherein said weightage factor associated with said memory comprises a variable per unit cost associated with said memory, wherein (b) comprises a weightage factor for a CPU, wherein said weightage factor for said CPU comprises a variable per unit cost associated with said CPU, wherein (c) comprises a weightage factor for network data transfer, wherein said weightage factor for said network data transfer comprises a variable per unit cost associated with said network data transfer, wherein (d) comprises a weightage factor associated with scheduling processes utilized for scheduling said jobs, wherein (e) comprises a weightage factor for a total number of preemptions, wherein said weightage factor for said total number of preemptions comprises a variable per unit cost associated with said total number of preemptions, wherein (f) comprises a total number of slots occupied and used, and wherein said (a), (b), (c), (d), (e), and (f) remain constant for a same type or category of said jobs if all additional parameters of a distributed environment remain constant.

14. The computer program product of claim 13, wherein said distributed file system comprises a multi tenanted distributed file system.

15. The computer program product of claim 14, wherein said job descriptor engine comprises circuitry for defining said characteristics of said jobs for execution on: said plurality of nodes, said hardware resources, said processors, said memory devices, and said distributed system networks.

16. The computer program product of claim 15, wherein said job descriptor engine receives inputs associated with said characteristics of said jobs during submission of said jobs submission via a descriptive syntax, wherein said characteristics of said jobs comprise a minimum and maximum memory required or a limit associated with a data transfer rate.

17. The computer program product of claim 16, wherein said job descriptor engine executes said machine learning circuit for dynamically updating itself with a history of job types, of said jobs, that have been executed in a specified sequence or have been submitted based on similar groups of users.

18. The computer program product of claim 16, wherein said job descriptor engine dynamically updates said characteristics of the jobs based on network delays, sudden change of data volumes, or hardware failure, and wherein said job descriptor engine monitors said plurality of nodes, said hardware resources, said processors, a cluster health, and cluster optimum processing capability.

19. The computer program of claim 13, wherein said resource infrastructure enables resource infrastructure improvements comprising replacing hardware components of said hardware resources.

20. A hardware device comprising a processor coupled to a computer-readable memory unit, said memory unit comprising instructions that when executed by the processor executes a distributed file system node metering and hardware usage technology improvement method comprising:

receiving from a user, by said processor, job data associated with jobs for execution via a distributed file system, wherein said hardware device comprises specialized discrete non-generic analog, digital, and logic based plugin circuitry including a specially designed integrated circuit designed for only implementing said distributed file system metering and hardware usage technology improvement method;

retrieving, by said processor enabling a policy engine circuit of said hardware device, policy and cost metrics data associated with hardware usage metering, wherein said policy and cost metrics data comprises policies implemented as pluggable components defined in advance, by: uploading xml files, via descriptor files or j son files, or via a command line, for said jobs;

retrieving, by said processor enabling a hardware device cluster, resource requests describing hardware resource usage of said jobs with respect to a level of the actual utilization of hardware resources;

querying, by said processor enabling a job descriptor engine of said hardware device, a first circuit for locating said policy and cost metrics data of said resource requests;

updating, by said processor based on a set of metrics of said policy and cost metrics data associated with said resource requests, a machine learning circuit with characteristics of said jobs associated with network delays, sudden change of memory data volumes, and hardware device failure;

detecting, by said processor enabling voltage sensors comprised by said hardware device, voltages associated with a hardware cluster;

detecting, by said processor enabling temperature sensors comprised by said hardware device, temperature readings associated with said hardware cluster, wherein said voltages and said temperature readings are analyzed to indicate a speed and usage of CPUs and a memory space available for said hardware cluster;

determining, by said processor enabling a metrics circuit with respect to said set of metrics, said voltages, and said temperature readings, utilized hardware resources of said hardware cluster with respect to said hardware usage metering of said resource requests; and allocating, by said processor based on results of said characteristics of said jobs and results of said determining said utilized hardware resources, specified queue memory and associated processor cores to said hardware cluster thereby enabling control functionality for overall resource utilization of said hardware cluster and improving execution of said jobs being executed on said hardware cluster;

generating, by said processor executing a resource descriptor circuit, resource infrastructure associated with hardware resources of said resource requests, wherein said generating is executed based on said policy engine circuit providing various policies and cost metrics for calculating said hardware usage metering, and wherein said policy engine circuit comprises the pluggable components;

monitoring, by said processor executing said job descriptor engine, a plurality of nodes, hardware resources, processors, memory devices, and distributed system networks; and determining, by said processor, a configuration of said hardware device cluster based on an analysis of types of workloads and said characteristics of said jobs;

determining, by said processor, workloads associated with said plurality of nodes, said hardware resources, said processors, said memory devices, and said distributed system networks;

determining, by said processor, a recommendation for improving said configuration of said hardware device cluster; and calculating, by said computer processor, a cost for improving said configuration of said hardware device cluster, wherein said Cost=(Confidence Factor)*$\Sigma_0^n$((a $\Sigma_{0\%}^{100\%}$ Memory)+(b $\Sigma_{0\%}^{100\%}$ CPU Utilization)+(c $\Sigma_{n=1}^{n=\infty}$ Network Data Transfer)+(d $\int_{t=0}^{t=n}$ Scheduler Time)+(e $\Sigma_0^n$ Preemption)+($\Sigma_0^n$ Slots Used)), wherein n is a number of said plurality of nodes, n1 is an execution time of said jobs, n2 is a number of times said jobs were preempted, and n3 is a number of slots allocated to said job, wherein a, b, c, d, and e are weightage factors, wherein (a) comprises a weightage factor associated with memory, wherein said weightage factor associated with said memory comprises a variable per unit cost associated with said memory, wherein (b) comprises a weightage factor for a CPU, wherein said weightage factor for said CPU comprises a variable per unit cost associated with said CPU, wherein (c) comprises a weightage factor for network data transfer, wherein said weightage factor for said network data transfer comprises a variable per unit cost associated with said network data transfer, wherein (d) comprises a weightage factor associated with scheduling processes utilized for scheduling said jobs, wherein (e) comprises a weightage factor for a total number of preemptions, wherein said weightage factor for said total number of preemptions comprises a variable per unit cost associated with said total number of preemptions, wherein (f) comprises a total number of slots occupied and used, and wherein said (a), (b), (c), (d), (e), and (f) remain constant for a same type or category of said jobs if all additional parameters of a distributed environment remain constant.

* * * * *